US009489427B2

(12) United States Patent
Xu

(10) Patent No.: US 9,489,427 B2
(45) Date of Patent: *Nov. 8, 2016

(54) SYSTEM, METHOD AND COMPUTER-READABLE MEDIUM FOR OPTIMIZATION OF MULTIPLE-PARALLEL JOIN OPERATIONS ON SKEWED DATA

(75) Inventor: Yu Xu, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,519

(22) Filed: May 8, 2012

(65) Prior Publication Data

US 2013/0124501 A1 May 16, 2013

Related U.S. Application Data

(63) Continuation of application No. 12/245,789, filed on Oct. 6, 2008, now Pat. No. 8,195,644.

(51) Int. Cl.
*G06F 17/30* (2006.01)
(52) U.S. Cl.
CPC .............................. *G06F 17/30498* (2013.01)
(58) Field of Classification Search
CPC ................... G06F 17/30498; G06F 17/30466
USPC .......... 707/705, E17.008, E17.017, E17.032, 707/714, 715
See application file for complete search history.

(56) References Cited

U.S. PATENT DOCUMENTS

| 5,121,494 | A | * | 6/1992 | Dias | G06F 17/30445 |
|---|---|---|---|---|---|
| 5,335,345 | A | * | 8/1994 | Frieder | G06F 17/30474 |
| 5,666,525 | A | | 9/1997 | Ross | |
| 5,864,842 | A | | 1/1999 | Pederson et al. | |
| 5,978,576 | A | | 11/1999 | Sanadidi et al. | |
| 5,983,215 | A | * | 11/1999 | Ross et al. | 707/714 |
| 6,038,564 | A | * | 3/2000 | Sameshima et al. | 707/702 |
| 6,732,107 | B1 | * | 5/2004 | Luo et al. | |
| 7,054,852 | B1 | | 5/2006 | Cohen | |
| 8,131,711 | B2 | | 3/2012 | Xu | |
| 2003/0088579 | A1 | * | 5/2003 | Brown et al. | 707/104.1 |
| 2004/0059743 | A1 | | 3/2004 | Burger | |
| 2006/0106777 | A1 | * | 5/2006 | Faunce | G06F 17/30469 |
| 2007/0130231 | A1 | | 6/2007 | Brown et al. | |
| 2009/0024568 | A1 | | 1/2009 | Al-Omari et al. | |
| 2009/0248617 | A1 | | 10/2009 | Molini | |

OTHER PUBLICATIONS

Yu Xu, Xin Zhou, Pekka Kpostamaa and Liang Chen, Handling Data Skew in Parallel Joins in Shared-Nothing Systems, SIGMOD'08, Jun. 9-12, 2008, Vancouver, BC, Canada, hereinafter "XU", pp. 1043-1052.*

\* cited by examiner

*Primary Examiner* — Shiow-Jy Fan
(74) *Attorney, Agent, or Firm* — Ramin Mahboubian; Randy L. Campbell, Jr.

(57) ABSTRACT

Techniques that facilitate management of skewed data during a parallel multiple join operation are provided. Portions of tables involved in the join operation can be distributed among a plurality of processing modules, and each of the processing modules can be provided with a list of skewed values of a join column of a larger table involved in the join operation. Each of the processing modules can scan the rows of first and second tables distributed to the processing modules and compare values of the join columns of both tables with the list of skewed values. One or more of the processing modules can then redistribute the skewed values.

12 Claims, 7 Drawing Sheets

SYSTEM, METHOD AND COMPUTER-READABLE MEDIUM FOR OPTIMIZATION OF MULTIPLE-PARALLEL JOIN OPERATIONS ON SKEWED DATA

CROSS-REFERENCE TO RELATED APPLICATIONS

This application is a Continuation of the U.S. patent application Ser. No. 12/245,789 which is entitled: "SYSTEM, METHOD, AND COMPUTER-READABLE MEDIUM FOROPTIMIZATION OF MULTIPLE PARALLEL JOIN OPERATIONS ON SKEWED DATA," filed on Oct. 6, 2008 now U.S. Pat. No. 8,195,644, and which is hereby incorporated by reference herein in its entirety and for all purposes.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, dealing with data skew in parallel joins is critical to the performance of many applications. As is understood, a join comprises a structured query language (SQL) operation that combines records from two or more tables. Contemporary parallel database systems provide for the distribution of data to different parallel processing units, e.g., Access Module Processors (AMPs), by utilizing hash redistribution mechanisms. When joining two or more relations, e.g., relations "R" and "S", by join conditions such as R.a=S.b, rows in both tables with the same join column values need to be relocated to the same processing unit in order to evaluate the join condition. To achieve this, contemporary systems typically implement one of two options.

Assume R and S are partitioned across various processing units and that neither R.a nor S.b are the primary index, e.g., the values that are originally hashed to distribute the base table rows to the processing units. The MPP optimizer may hash redistribute rows of R on R.a and hash redistribute rows of S on S.b. By using the same hash function, rows with the same join column values are ensured to be redistributed to the same processing unit. The optimizer will then choose the best join method in the local processing unit, e.g., based on collected statistics or other criteria. Such a parallel join mechanism is referred to herein as redistribution.

Redistribution is typically efficient when the rows are sufficiently evenly distributed among the processing units. However, consider the case where there is highly skewed data in column R.a and/or S.b. In this situation, a processing unit will have an excessive load with respect to other processing units involved in the join operation. A processing unit featuring an excessive load in such a situation is referred to herein as a hot processing unit. Consequently, the system performance is degraded and may result in an "out of spool space" error on the hot processing unit which may cause, for example, queries to abort after hours of operation in large data warehouses.

Alternatively, the optimizer may choose to duplicate the rows of one relation among the processing units. For example, assume the relation R is much larger than the relation S. In such a situation, the rows of R may be maintained locally at each processing unit where R resides, and the rows of S are duplicated among each of the processing units. Such a mechanism is referred to as table duplication. By this mechanism, rows with the same join column values will be located at the same processing unit thereby allowing completion of the parallel join operation. However, efficient performance utilizing a duplication mechanism requires for one relation to be sufficiently small to allow for duplication on all the parallel units.

SUMMARY

Disclosed embodiments provide a system, method, and computer readable medium for resolving data skew issues when executing multiple parallel joins. Rows of tables involved in a join operation are distributed among a plurality of processing modules, and each of the processing modules is provided with a list of skewed values of a join column of a larger table involved in the join operation. Each of the processing modules scans the rows of first and second tables distributed to the processing modules and compares values of the join columns of both tables with the list of skewed values. Rows of the larger table having non-skewed values in the join column are redistributed, and rows of the larger table having skewed values in the join column are maintained locally at the processing modules. Rows of the second table that have non-skewed values in the join column are redistributed, and rows of the smaller table that have skewed values in the join column are duplicated among the processing modules. Rows of the third table are redistributed based on the join attribute values of the rows. Rows of the first and second tables redistributed to a processing module are joined to generate a first data set of a processing module, and rows of the first table that have been maintained locally by a processing module due to detection of skewed values are joined with duplicated rows of the second table to generate a second local data set at a processing module. Rows of the second data set are redistributed according to the join attribute values of the second data set. A local join data set is then generated by joining rows of the third table that have been redistributed to a processing module with a union of the processing module's first data set and rows received by the processing module as a result of redistribution of other processing module's second data set.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
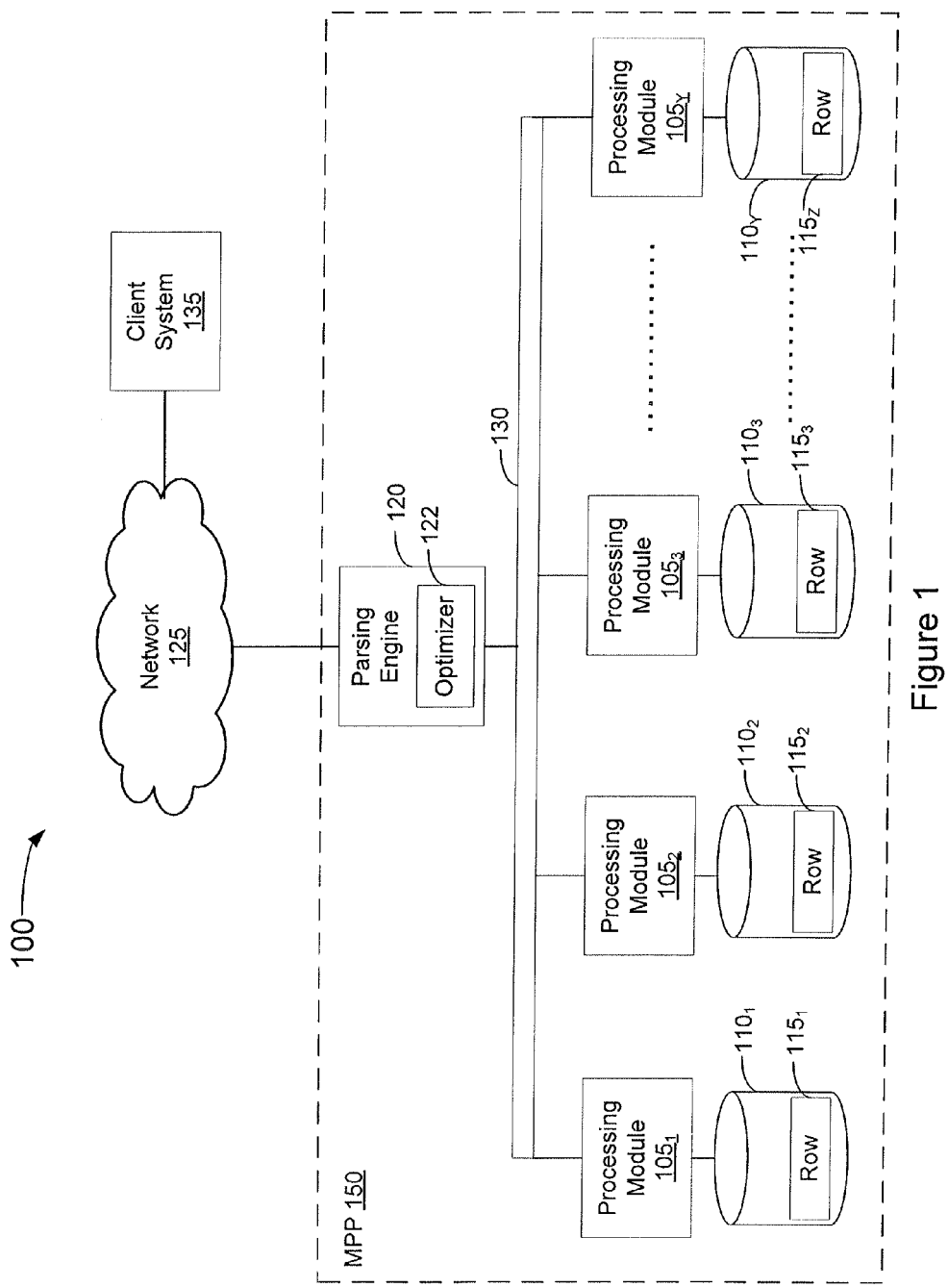
FIG. 1 depicts a diagrammatic representation of an exemplary architecture for a large database system suited for implementing a partial redistribution, partial duplication mechanism that facilitates processing of a multiple parallel join operations with data skew in accordance with disclosed embodiments.

FIG. 1 depicts a diagrammatic representation of an exemplary architecture for a large database system 100, such as a Teradata Active Data Warehousing System, that is suited for implementing a partial redistribution, partial duplication mechanism that facilitates processing of a multiple parallel join operations with data skew in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing modules $105_{1 \ldots Y}$ that manage the storage and retrieval of data in data-storage facilities $110_{1 \ldots Y}$. Each of the processing modules may host one or more AMPs. Each of the processing modules $105_{1 \ldots Y}$ manages a portion of a database that is stored in a corresponding one or more of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Z}$ of the tables are stored across multiple data-storage facilities $110_{1 \ldots Y}$ to ensure that the system workload is distributed evenly across the processing modules $105_{1 \ldots Y}$. A parsing engine 120 organizes the storage of data and the distribution of table rows $115_{1 \ldots Z}$ among the processing modules $105_{1 \ldots Y}$ and accesses processing modules $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network connection 125. The parsing engine 120, on receiving an incoming database query, applies an optimizer 122 component to the query to assess the best plan for execution of the query. Selecting the optimal query-execution plan includes, among other things, identifying which of the processing modules $105_{1 \ldots Y}$ are involved in executing the query and which database tables are involved in the query, as well as choosing which data-manipulation techniques will serve best in satisfying the conditions of the query. Database statistics may be used in making these assessments during construction of the query-execution plan. For example, database statistics may be used by the optimizer to determine data demographics, such as attribute minimum and maximum values and data ranges of the database. Further, database statistics may be obtained to identify highly repetitive, or skewed, values. The database system typically receives queries in a standard format, such as the Structured Query Language (SQL) put forth by the American National Standards Institute (ANSI).

In a system in which rows of tables or relations may be distributed across multiple processing nodes, a join operation executed in parallel may be performed efficiently when the data is uniformly distributed across the system. Table rows may be redistributed across AMPs by hashing the columns that are involved in the join and redistributing the rows according to the hashed column values in the event that the columns involved in the parallel join are not primary indexes on which the table columns are originally distributed within the MPP system.

However, if one processing module, e.g., an AMP, receives much more data than other AMPs, processing of a parallel join may demonstrate a relatively slow response time, excessive system resource usage, and such an operation may exhibit a low overall system parallel efficiency. Adding additional nodes or AMPs may decrease the overall parallel efficiency since adding more nodes may result in distribution of less rows to each non-hot AMP thereby producing a greater relative disproportionate distribution of rows to the hot AMP.

An AMP may receive significantly more data due to various causes, such as a natural demographic data skew, e.g., high biased values, skew resulting from null values, or various other causes. When executing a parallel join, a table may be duplicated to each AMP involved in processing of the parallel join if the table is much smaller than the other table involved in the parallel join.

Redistribution of tables on join columns often results in severely degraded performance if a join column has highly-skewed values. Duplication of the smaller table involved in a join is typically efficient when skew occurs in the join column of the larger table assuming the rows are evenly distributed across the AMPs. However, the duplication cost is not scalable—the larger the system, the more expensive table duplication is in terms of both I/O and CPU cost on all AMPs as well as the overall network bandwidth. In accordance with disclosed embodiments, a partial redistribution, partial duplication mechanism is provided that alleviates problems commonly encountered with table redistribution and table duplication mechanisms when executing a multiple parallel join operation.

Figure 2:
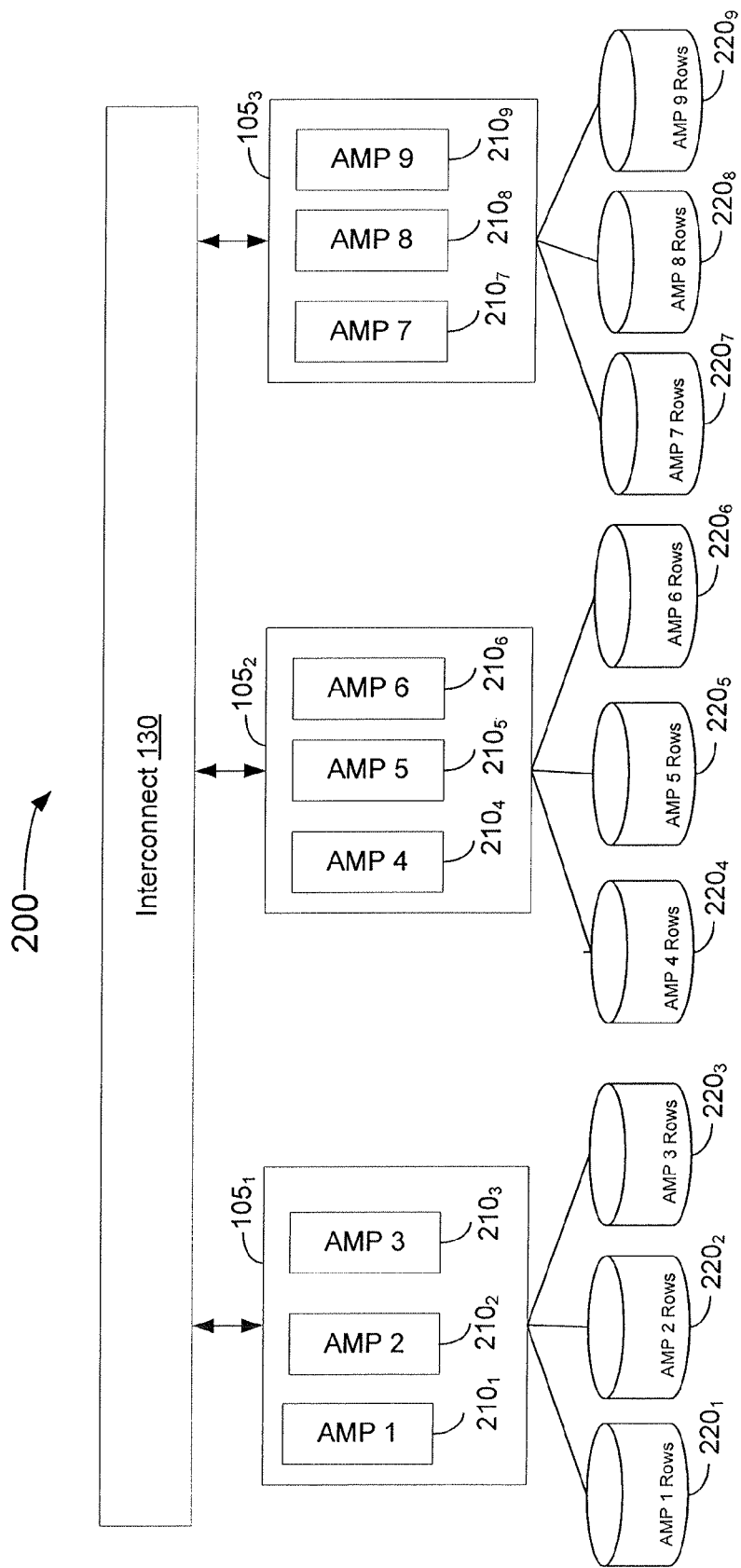
FIG. 2 is a diagrammatic representation of an massively parallel processing system configuration in which table redistribution and duplication may be performed to facilitate execution of a multiple parallel join operation in accordance with disclosed embodiments.

FIG. 2 is a diagrammatic representation of an MPP configuration 200 in which table redistribution and duplication may be performed to facilitate execution of a multiple parallel join operation in accordance with disclosed embodiments. In the illustrative example, assume the rows of three tables involved in a multiple join operation have been distributed across nine AMPs $210_1$-$210_9$ hosted by processing modules $105_1$-$105_3$ such that each of the AMPs is allocated rows $220_1$-$220_9$.

Figure 3:
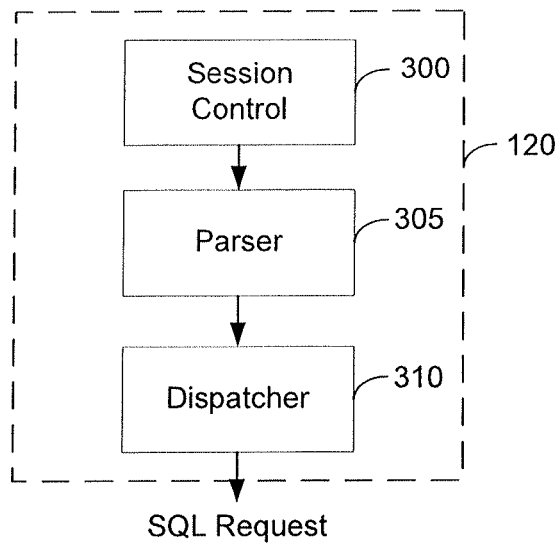
FIG. 3 is a diagrammatic representation of a parsing engine implemented in accordance with an embodiment.
Figure 4:
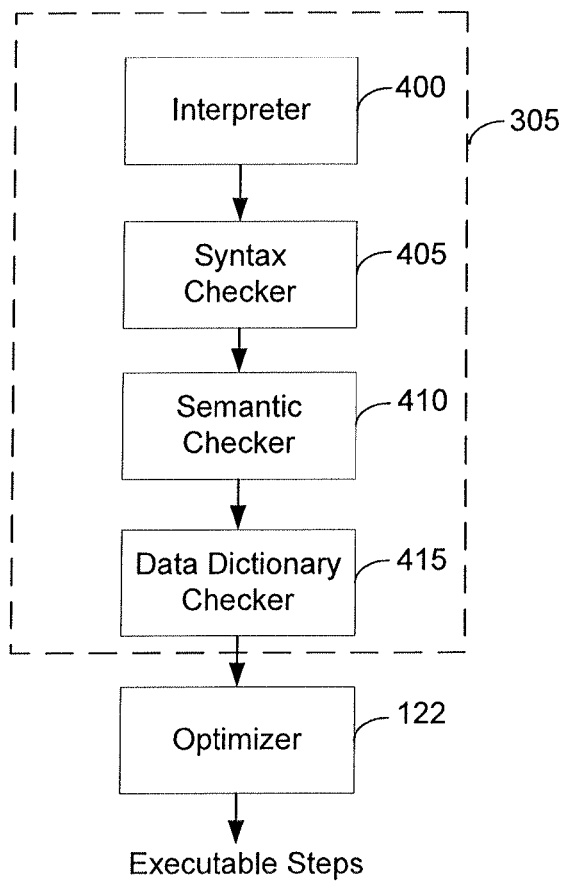
FIG. 4 is a diagrammatic representation of a parser implemented in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

Consider a multiple join operation to be executed that is specified by the following:

Select * from TableR, TableS, TableY where TableR.a=TableS.b and TableR.a=TableY.c In the present example, assume that the rows of TableR, TableS, and TableY are distributed among AMPs $210_1$-$210_9$ via a hash of primary indexes of TableR, TableS, and TableY and that the primary indexes are not column a of TableR, column b of TableS, nor column c of TableY. In this situation, the rows may be redistributed by hashing the join columns TableR.a, TableS.b, and TableY.c and redistributing the rows based on the hash values such that rows from TableR, TableS, and TableY that match on the join columns TableR.a, TableS.b, and TableY.c are redistributed to the same processing modules or AMPs.

In accordance with an embodiment, data skew issues are managed by detecting data skew in a table involved in the join operation and providing the optimizer 122 with a list L of skewed values. In the examples provided herein, it is assumed that a join is to be performed on column "a" of a table designated TableR, column "b" of a table designated TableS, and column "c" of a table designated TableY. It is further assumed that the values of TableR.a are skewed, that the skew of TableR is detected, and a list L of skewed values of TableR.a is provided to the optimizer 122 or is generated by the optimizer. A disclosed partial redistribution, partial duplication mechanism is provided that significantly alleviates performance issues of a multiple parallel join involving skewed data.

On each AMP where rows of the larger, skewed table TableR resides, a full table scan of TableR is performed a single time. Alternatively, the scan may be performed on an index of the TableR if there are selections and applicable indexes built on TableR. A spool is then allocated for each AMP having rows of TableR. A spool, $Spool^R_{local}$, contains all rows of TableR having an attribute value of TableR.a that matches any value in the list L of skewed values. Each AMP hashes the join column TableR.a of rows and redistributes the rows to other AMPs if the TableR.a value is not skewed.

If the TableR.a value of a row matches a skewed value, the AMP does not redistribute the row but instead appends the row to the spool $Spool^R_{local}$.

On each AMP where the TableS resides, a full table scan of TableS is performed once. Alternatively, a full scan of an index of TableS may be performed if there are selections on TableS and there are applicable indexes built on TableS. If the TableS.b value of a row matches a skewed value, the row is appended to a duplicate buffer, or other suitable memory space, allocated to the AMP. Upon completion of the table scan by an AMP, the rows that have been identified as having a skewed value of the column TableS.b are duplicated to a respective spool $Spool^S_{dup}$ of each AMP where TableR resides. For example, duplication of the rows of TableS having a skewed column TableS.b value may be performed by the interconnect 130, associated hardware and/or software.

On each AMP where the TableY resides, a full table scan of TableY is performed once. Alternatively, a full scan of an index of TableY may be performed if there are selections on TableY and there are applicable indexes built on TableY. Each row of the table TableY is hash redistributed on the join attribute TableY.c.

Each AMP may allocate a respective spool $Spool^R_{redis}$ in which the AMP appends rows of TableR that have been redistributed to the AMP. Likewise, each AMP may allocate a respective spool $Spool^S_{redis}$ and a spool $Spool^Y_{redis}$ in which the AMP respectively appends rows of TableS and TableY that have been redistributed to the AMP. Each AMP may allocate a respective spool $Spool^S_{dup}$ in which the AMP appends rows of TableS that have been duplicated in the MPP system.

When the partial redistribution and partial duplication of the tables has been completed, each AMP then generates a first data set by joining the contents of the AMP's spools $Spool^R_{redis}$ and $Spool^S_{redis}$. Each AMP generates a second data set by joining the contents of the AMP's spools $Spool^R_{local}$ and $Spool^S_{dup}$. Each AMP then hash redistributes the second data set on the attribute Table1.a and places rows received from other AMPs resulting from redistribution of an AMP's second data set in a spool (designated $Spool_{set2}$). A local join data set is then generated by each AMP by performing a join on the rows of the table TableY redistributed thereto with the union of the AMP's first data set and rows of the second data set redistributed to the AMP. The parallel join operation may then be completed by performing a merge of each AMP's local join data set.

Figure 5:
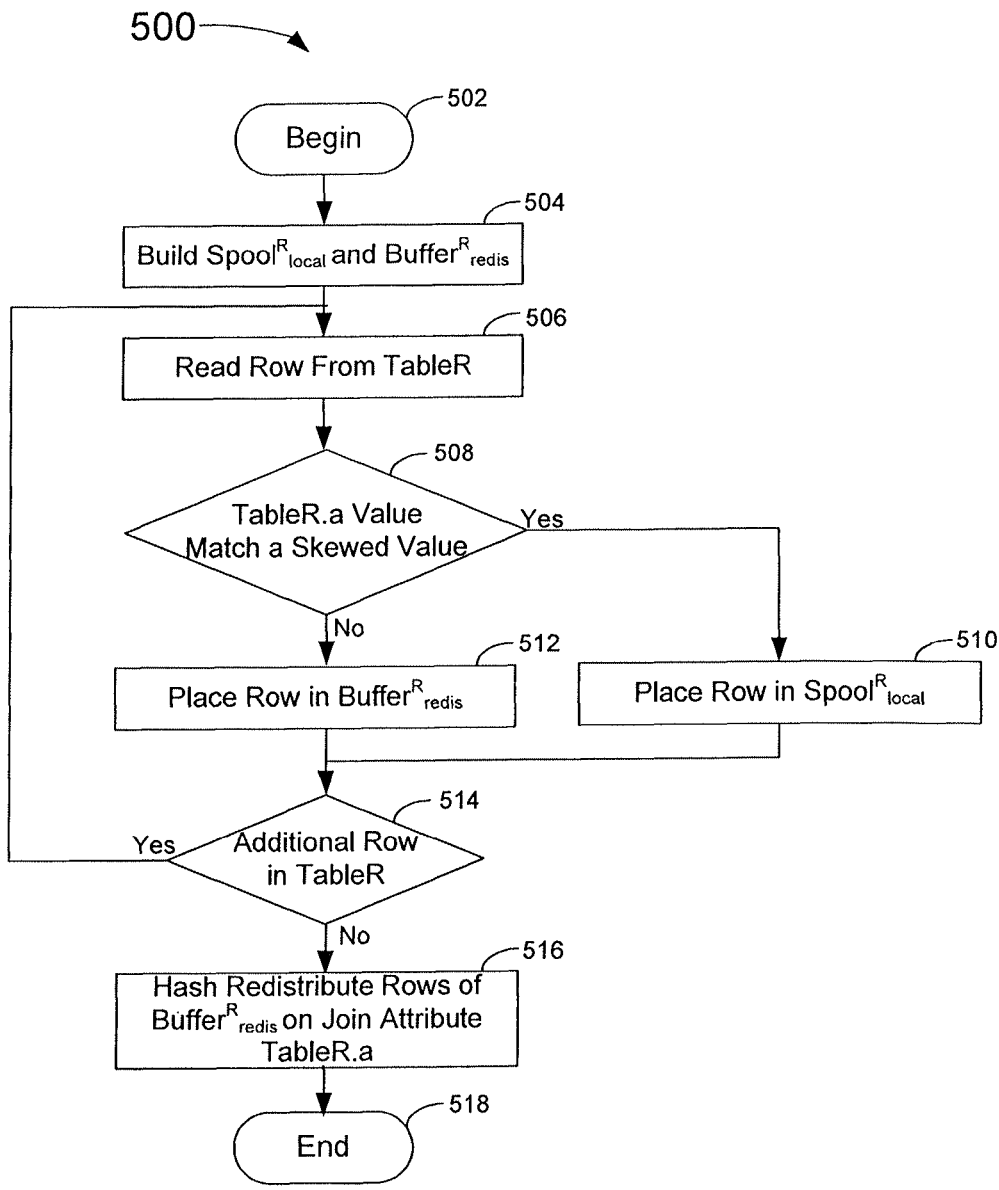
FIG. 5 is a flowchart that depicts processing of a partial redistribution, partial duplication subroutine that facilitates skew management for multiple parallel join operations implemented in accordance with an embodiment.

FIG. 5 is a flowchart 500 that depicts processing of a PRPD subroutine that facilitates skew management for multiple parallel join operations implemented in accordance with an embodiment. The processing steps of FIG. 5 may be implemented as computer-executable instructions tangibly embodied on a computer-readable medium executable by a processing system, such as one or more of the AMPs $210_1$-$210_9$ depicted in FIG. 2 of the database system 100 depicted in FIG. 1. An instance of the PRPD subroutine depicted and described with reference to FIG. 5 is run on each AMP that has rows of a skewed table TableR initially distributed thereto.

The PRPD subroutine is invoked (step 502), and the AMP allocates a spool (designated $Spool^R_{local}$) for storage of TableR rows that are to be locally maintained by the AMP as well as a buffer (designated $Buffer^R_{redis}$) for temporary storage of TableR rows that are to be redistributed by the AMP (step 504). In the example provided hereinabove, assume each of the AMPs $210_1$-$210_9$ initially has rows of TableR distributed thereto. Accordingly, each of the AMPs $210_1$-$210_9$ allocate a respective spool Spool$^R_{local}$. Each of the AMPs then begins reading rows of TableR from the respective rows $220_1$-$220_9$ originally distributed thereto (step 506). The attribute value of the join column TableR.a of a row of TableR is then read and compared with the skewed values list L, and an evaluation is made to determine if the TableR.a value of the row matches a skewed value (step 508). If the attribute value of TableR.a of the row read from TableR matches a skewed value, the AMP appends the row to the AMP's spool Spool$^R_{local}$ (step 510). Rows detected to have a skewed value of a join attribute of the first, larger table are maintained locally thereby providing a potential alleviation of excessive loading of processing modules due to the data skew. The PRPD subroutine may then proceed to evaluate whether an additional row of TableR remains to be processed (step 514). If it is determined at step 508 that the attribute value TableR.a of the row read from TableR does not match a skewed value, the AMP places the row in a buffer (designated Buffer$^R_{redis}$) or other memory allocation (step 512). An evaluation may then be made to determine if any additional rows of TableR remain for processing according to step 514. If an additional row of TableR remains, the AMP may then read the row according to step 506. When no additional rows of TableR remain to be evaluated, the rows of the buffer Buffer$^R_{redis}$ are then hash redistributed on the join attribute TableR.a (step 516). In other implementations, it is not necessary to complete allocation of all rows to be redistributed to the buffer Buffer$^R_{redis}$ prior to invoking redistribution of the rows. That is, redistribution of the rows at step 516 may be performed, at least in part, in parallel with step 512, and rows may be redistributed as one or more rows are identified for redistribution at step 512. The PRPD subroutine cycle may then end (step 518).

Figure 6:
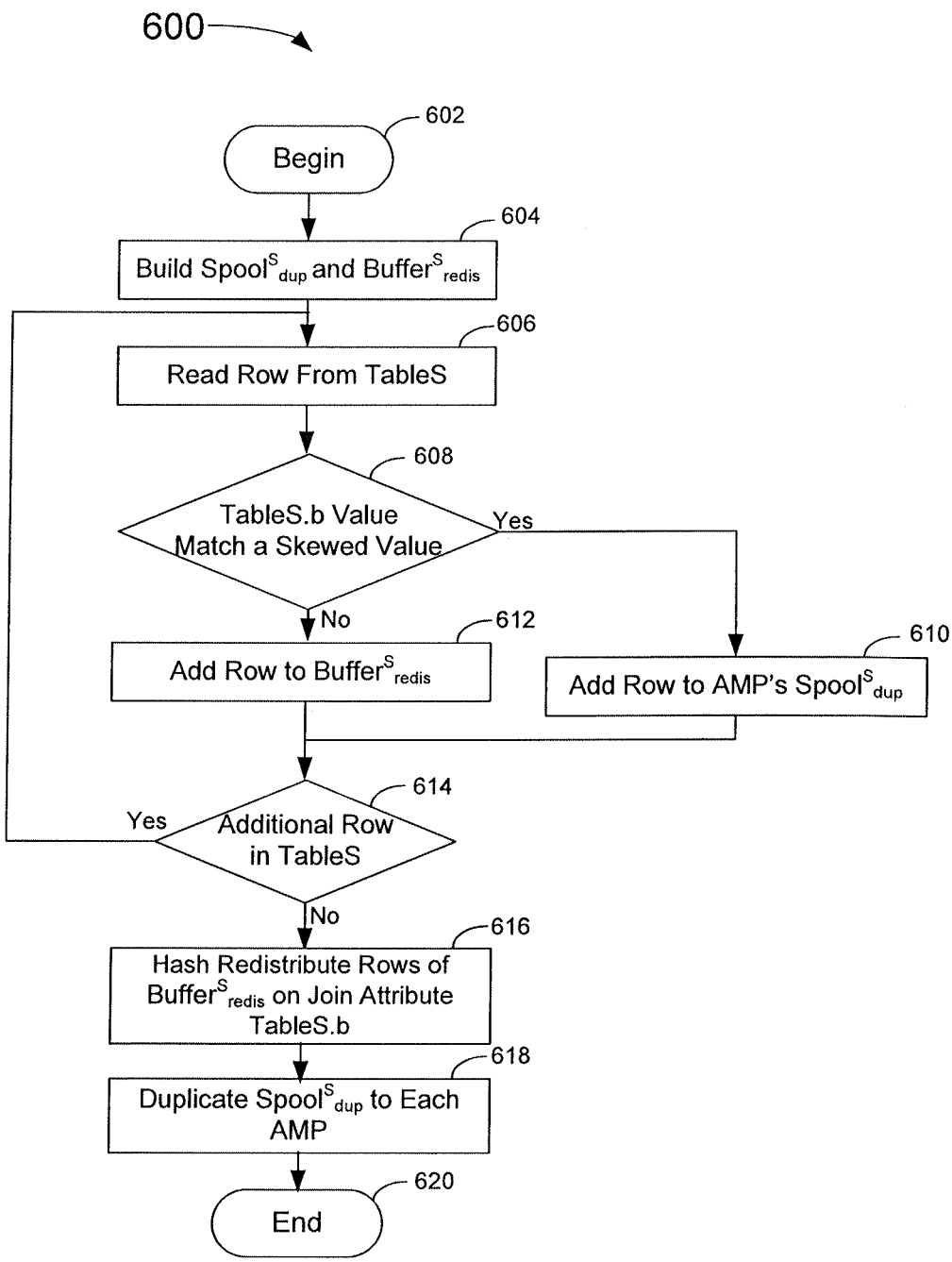
FIG. 6 is a flowchart that depicts processing of a partial redistribution, partial duplication subroutine that facilitates skew management for multiple parallel join operations implemented in accordance with an embodiment.

FIG. 6 is a flowchart 600 that depicts processing of a PRPD subroutine that facilitates skew management for multiple parallel join operations implemented in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 2 of the database system 100 depicted in FIG. 1. An instance of the PRPD subroutine depicted and described with reference to FIG. 6 is run on each AMP that has rows of the TableS initially distributed thereto.

The PRPD subroutine is invoked (step 602), and the AMP allocates a spool (designated Spool$^S_{dup}$) for storage of TableS rows that are to be duplicated by the AMP as well as a buffer (designated Buffer$^S_{redis}$) for temporary storage of TableS rows that are to be redistributed by the AMP (step 604). In the example provided hereinabove, assume each of the AMPs $210_1$-$210_9$ initially has rows of TableS distributed thereto. Accordingly, each of the AMPs $210_1$-$210_9$ allocates a respective spool Spool$^S_{dup}$. Each of the AMPs $210_1$-$210_9$ then begins reading rows of TableS from the respective rows $220_1$-$220_9$ originally distributed thereto (step 606). The attribute value of the join column TableS.b of a row of TableS is then read and compared with the skewed values list L, and an evaluation is made to determine if the join attribute TableS.b value matches a skewed value (step 608). If the attribute value TableS.b of the row read from TableS matches a skewed value, the row is appended to the AMP's spool Spool$^S_{dup}$ (step 610). The PRPD subroutine may then proceed to determine whether an additional row of TableS remains to be evaluated (step 614).

If it is determined that the attribute value TableS.b of the row read from TableS does not match a skewed value at step 608, the AMP appends the row to a buffer Buffer$^S_{redis}$ allocated to the AMP (step 612). An evaluation may then be made to determine if any additional rows of TableS remain for processing according to step 614. If an additional row of TableS remains, the AMP may then read the row according to step 606. If no additional rows remain, the AMP may then hash redistribute the rows of the Buffer$^S_{redis}$ on the join column attributes TableS.b (step 616). In other implementations, it is not necessary to complete allocation of all rows to be redistributed to the buffer Buffer$^S_{redis}$ prior to invoking redistribution of the rows. That is, redistribution of the rows at step 616 may be performed, at least in part, in parallel with step 612, and rows may be redistributed as one or more rows are identified for redistribution at step 612. Further, the AMP duplicates the rows of the AMP's spool Spool$^S_{dup}$ to each of the AMPs involved in the multiple join operation (step 618). In other implementations, it is not necessary to complete allocation of all rows to be duplicated to the spool Spool$^S_{dup}$ prior to invoking duplication of the rows. That is, duplication of the rows at step 618 may be performed, at least in part, in parallel with step 610, and rows may be duplicated as one or more rows are identified for duplication at step 610. It should be understood that each AMP, including the AMP that sources rows to be duplicated, has the duplicated rows stored in the AMP's respective spool Spool$^S_{dup}$. The PRPD subroutine cycle may then end (step 620).

Figure 7:
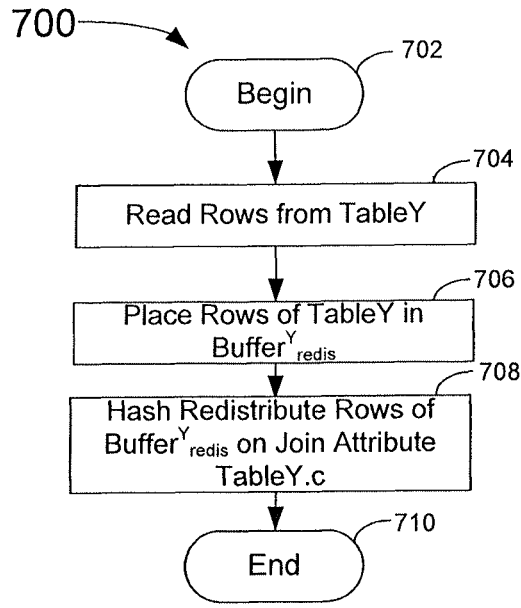
FIG. 7 is a flowchart that depicts processing of a partial redistribution, partial duplication subroutine that facilitates skew management for multiple parallel join operations implemented in accordance with an embodiment.

FIG. 7 is a flowchart 700 that depicts processing of a PRPD subroutine that facilitates skew management for multiple parallel join operations implemented in accordance with an embodiment. The processing steps of FIG. 7 may be implemented as computer-executable instructions tangibly embodied on a computer-readable medium executable by a processing system, such as one or more of the AMPs $210_1$-$210_9$ depicted in FIG. 2 of the database system 100 depicted in FIG. 1. An instance of the PRPD subroutine depicted and described with reference to FIG. 7 is run on each AMP that has rows of the TableY initially distributed thereto.

The PRPD subroutine is invoked (step 702), and the AMP reads rows of the table TableY allocated to the AMP (step 704). The AMP buffers the rows of TableY in a buffer (designated Buffer$^Y_{redis}$) (step 706). The AMP then hash redistributes the rows of the buffer Buffer$^Y_{redis}$ on the join attribute TableY.c (step 708). The PRPD subroutine cycle may then end (step 710).

Figure 8:
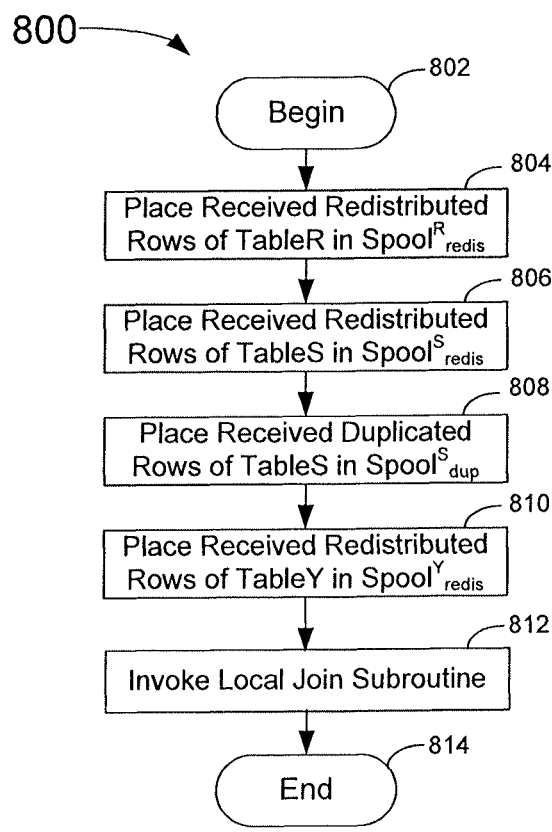
FIG. 8 is a flowchart that depicts processing of a partial redistribution, partial duplication subroutine that provides for receipt of redistributed and duplicated rows to facilitate management of data skew encountered in a multiple parallel join operation implemented in accordance with an embodiment.

FIG. 8 is a flowchart 800 that depicts processing of a PRPD subroutine that provides for receipt of redistributed and duplicated rows to facilitate management of data skew encountered in a multiple parallel join operation implemented in accordance with an embodiment. The processing steps of FIG. 8 may be implemented as computer-executable instructions tangibly embodied on a computer-readable medium executable by a processing system, such as one or more of the AMPs $210_1$-$210_9$ depicted in FIG. 2 of the database system 100 depicted in FIG. 1. An instance of the PRPD subroutine depicted and described with reference to FIG. 8 may be run for each AMP that receives redistributed and/or duplicated rows from any AMP involved in the join operation.

The PRPD subroutine is invoked (step 802), and the AMP places rows of the table TableR redistributed to the AMP in a spool Spool$^R_{redis}$ allocated to the AMP (step 804). Likewise, the AMP places rows of the table TableS redistributed to the AMP in a spool Spool$^S_{redis}$ allocated to the AMP (step 806). Rows of the table TableS duplicated to the AMP are appended to a spool (designated Spool$^S_{dup}$) allocated to the AMP (step 808). The AMP places rows of TableY redistributed to the AMP in a spool Spool$^Y_{redis}$ allocated to the AMP (step 810). When all redistributed and duplicated rows have been received and spooled by the AMP, a local join subroutine described below with reference to FIG. 9 may be invoked (step 812), and the PRPD subroutine cycle may end (step 814).

Figure 9:
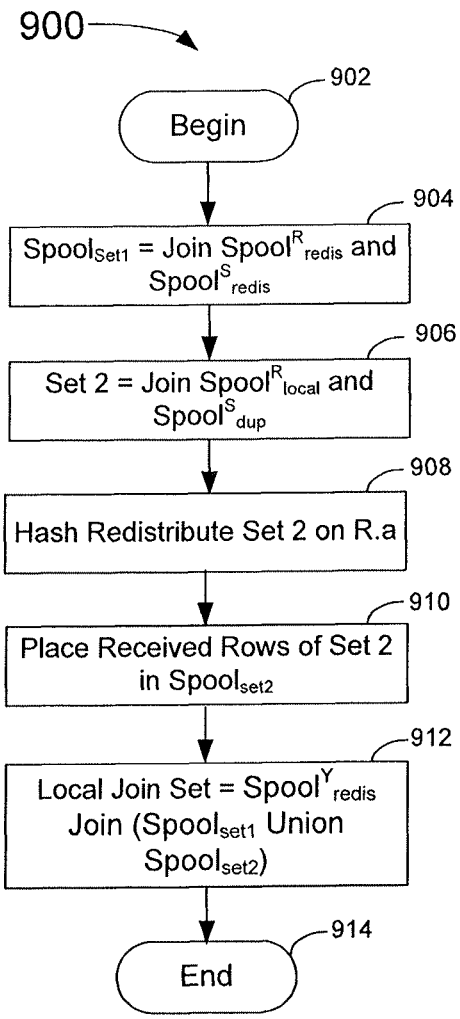
FIG. 9 is a flowchart that depicts processing of an instance of a local join subroutine that performs a multiple local join in accordance with an embodiment.

FIG. 9 is a flowchart 900 that depicts processing of an instance of a local join subroutine that performs a multiple local join in accordance with an embodiment. The processing steps of FIG. 9 may be implemented as computer-executable instructions tangibly embodied on a computer-readable medium executable by a processing system, such as one or more of the AMPs $210_1$-$210_9$ depicted in FIG. 2 of the database system 100 depicted in FIG. 1. The processing steps of FIG. 9 generally correspond to step 812 of FIG. 8.

The local join subroutine is invoked (step 902), and the AMP generates a first data set (Set 1) by joining the AMP's spools Spool$^R_{redis}$ and Spool$^S_{redis}$ on the join attributes TableR.a and TableS.b (step 904). The first data set may be placed into a spool allocated for the AMP, e.g., in a spool designated Spool$_{set1}$. Each AMP generates a second data set (Set 2) by joining the AMP's spool Spool$^R_{local}$ and spool Spool$^S_{dup}$ on the join attributes TableR.a and TableS.b (step 906). The AMP then hash redistributes the rows of the second data set, Set 2, on the TableR join attribute, TableR.a (step 908). Rows received by the AMP as a result of the redistribution of an AMPs data set Set 2 are placed into a spool (designated Spool$_{set2}$) allocated thereto (step 910). The AMP then generates a local join data set (designated Local Join Set) by joining the spool (Spool$^Y_{redis}$) in which the redistributed rows of the table TableY have been stored with the union of the AMP's Spool$_{Set1}$ and Spool$_{Set2}$ (step 912). The local join subroutine then ends (step 914). The parallel join may then be completed by merging each AMP's local join data set.

The depiction and description of FIG. 9 is not intended to imply process serialization of the described local join subroutine. For example, generation of the first data set according to step 904 and the second data set according to step 906 may be performed in parallel. Further, redistribution of the second data set according to step 908 may be invoked prior to completion of generation of the first data set according to step 904. In still other implementations, redistribution of the second data set according to step 908 may be performed, at least in part, in parallel with generation of the second data set. That is, as join results are obtained for the second data set, redistribution of the resultant rows according to step 908 may be invoked while generation of the second data set according to step 906 is still processing. Other variations of the subroutine processing depicted in FIG. 9 will be recognized by those skilled in the art.

As described, a method, computer-readable medium, and system that facilitates management of data skew during a parallel multiple join operation are provided. Portions of tables involved in the join operation are distributed among a plurality of processing modules, and each of the processing modules is provided with a list L of skewed values of a join column of a larger table involved in the join operation. Each of the processing modules scans the rows of the tables distributed to the processing modules and compares values of the join columns of a first, larger tables and a second table with the list of skewed values. Rows of the larger table having a join column value that match a skewed value are stored locally in a spool, while rows of the larger table having a join column value that do not match a skewed value are hash redistributed on the join column. Rows of the smaller table having a join column value that match a skewed value are duplicated to all the processing modules, while rows of the smaller table having a join column value that do not match a skewed value are hash redistributed on the join column. Rows of a third table involved in the join operation are redistributed based on the join attribute value of the rows. A local join data set is then generated by each of the processing modules, and the parallel join is completed by merging each of the processing module's local join data set. Accordingly, part of the larger table is redistributed and part of the larger table is maintained locally at the processing modules. Part of a smaller table is redistributed, and part of the smaller table is duplicated.

The flowcharts of FIGS. 5-9 depict process serialization to facilitate an understanding of disclosed embodiments and are not necessarily indicative of the serialization of the operations being performed. In various embodiments, the processing steps described in FIGS. 5-9 may be performed in varying order, and one or more depicted steps may be performed in parallel with other steps. Additionally, execution of some processing steps of FIGS. 5-9 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of facilitating a multiple join operation in a processing system that includes a plurality of processing modules, wherein the join operation comprises a join on a column of a first table, a column of a second table, and a column of a third table, the method comprising:
   distributing a respective set of rows of the first, second and third tables to each of the plurality of processing modules;
   redistributing by each of the plurality of processing modules to at least another one of the plurality of processing modules: (i) each row of the respective set of rows of the first table that has a value of the column of the first table that does not match any one of skewed values of the column of the first table, (ii) each row of the respective set of rows of the second table that has a value of the column of the second table that does not match any of the skewed values of the column of the first table and (iii) one or more rows of the distributed respective set of rows of the third table involved in the join operation;
   locally maintaining, by a first processing module of the plurality of processing modules, one or more of the distributed respective set of rows that each has a value of the column of the first table that matches one of the skewed values;
   duplicating, by a second processing module of the plurality of processing modules, one or more of the distributed respective set of rows that each has a value of the column of the second table that matches one of the skewed values; and
   processing, by the first processing module of the plurality of processing modules, any row of the respective set of rows that has a value of the column of the first table that matches any of the skewed values.

2. The method of claim 1, wherein the locally maintaining of the one or more comprises:
   maintaining one or more rows of the respective set of rows that has a value of the column of the first table that matches any of the skewed values in a spool allocated to the first processing module for rows of the respective set that are not redistributed.

3. The method of claim 1, wherein the method further comprises:
   receiving, by each of the plurality of processing modules, a list of skewed values of the column of the first table, wherein the skewed values are not uniformly distributed among the plurality of processing modules by the distributing of the respective set of rows of the first table; and
   performing the join operation by the plurality of the processing modules on the column of the first table and the column of the second table.

4. The method of claim 1, wherein the processing system is a parallel processing system and, wherein at least one of the distributing or redistributing is performed in parallel with respect to the first and second processing modules.

5. A processing system that includes:
   a plurality of processing modules that collectively include one or more processors, wherein the processing system is operable to facilitate a join operation on at least: a column of a first table, a column of a second table, and a column of a third table, and wherein the processing system is further operable to:
   distribute a respective set of rows of the first and second tables to each of the plurality of processing modules;
   redistribute, by each of the plurality of processing modules to at least another one of the plurality of processing modules: (i) each row of the respective set of rows of the first column that has a value of the column of the first table that does not match any one of skewed values of the column of the first table, and (ii) each row of the respective set of rows of the second table that has a value of the column of the second table that does not match any of the skewed values of the column of the first table; and (iii) one or more rows of the distributed respective set of rows of the third table involved in the join operation;
   locally maintain, by a first processing module, one or more rows of the respective set of rows that has a value of the column of the first table that matches any of the skewed values in a spool allocated to the first processing module for rows of the respective set that are not redistributed;
   duplicate, by a second processing module of the plurality of processing modules, one or more of the distributed respective set of rows that each has a value of the column of the second table that matches one of the skewed values; and
   process, by the first processing module of the plurality of processing modules, any row of the respective set of rows that has a value of the column of the first table that matches any of the skewed values.

6. The processing system of claim 5, wherein the first processing module is further operable locally maintain one or more rows of the respective set of rows that has a value of the column of the first table that matches any of the skewed values in a spool allocated to the first processing module for rows of the respective set that are not redistributed.

7. The processing system of claim 6, wherein the processing system is further operable to:
   receive, by each of the plurality of processing modules, a list of skewed values of the column of the first table, wherein the skewed values are not uniformly distributed among the plurality of processing modules by the distributing of the respective set of rows of the first table; and
   perform the join operation by the plurality of the processing modules on the column of the first table and the column of the second table.

8. The processing system of claim 6, wherein the processing system is a parallel processing system and, wherein at least one of the distribution or redistribution is performed in parallel with respect to the first and second processing modules.

9. A non-transient computer readable storage medium storing at least executable computer code for facilitating a multiple join operation in a processing system that includes a plurality of processing modules, wherein the join operation comprises a join on a column of a first table, a column of a second table, and a column of a third table, and wherein when executed by the processing system, the executable computer code causes:

distributing a respective set of rows of the first and second tables to each of the plurality of processing modules;

redistributing by each of the plurality of processing modules to at least another one of the plurality of processing modules: (i) each row of the respective set of rows of the first table that has a value of the column of the first table that does not match any one of skewed values of the column of the first table, (ii) each row of the respective set of rows of the second table that has a value of the column of the second table that does not match any of the skewed values of the column of the first table, and (iii) one or more rows of the distributed respective set of rows of the third table involved in the join operation;

locally maintaining, by a first processing module of the plurality of processing modules, one or more of the distributed respective set of rows that each has a value of the column of the first table that matches one of the skewed values;

duplicating, by a second processing module of the plurality of processing modules, one or more of the distributed respective set of rows that each has a value of the column of the second table that matches one of the skewed values; and processing, by the first processing module of the plurality of processing modules, any row of the respective set of rows that has a value of the column of the first table that matches any of the skewed values.

10. The non-transient computer readable storage medium of claim 9, wherein the locally maintaining of the one or more comprises:

maintaining one or more rows of the respective set of rows that has a value of the column of the first table that matches any of the skewed values in a spool allocated to the first processing module for rows of the respective set that are not redistributed.

11. The non-transient computer readable storage medium of claim 9, wherein when executed by the processing system, the executable computer code further causes:

receiving, by each of the plurality of processing modules, a list of skewed values of the column of the first table, wherein the skewed values are not uniformly distributed among the plurality of processing modules by the distributing of the respective set of rows of the first table; and performing the join operation by the plurality of the processing modules on the column of the first table and the column of the second table.

12. The non-transient computer readable storage medium of claim 9, wherein when executed by the processing system, the executable computer code further causes:

receiving, by each of the plurality of processing modules, a list of skewed values of the column of the first table, wherein the skewed values are not uniformly distributed among the plurality of processing modules by the distributing of the respective set of rows of the first table; and performing the join operation by the plurality of the processing modules on the column of the first table and the column of the second table.

\* \* \* \* \*